UNITED STATES PATENT OFFICE.

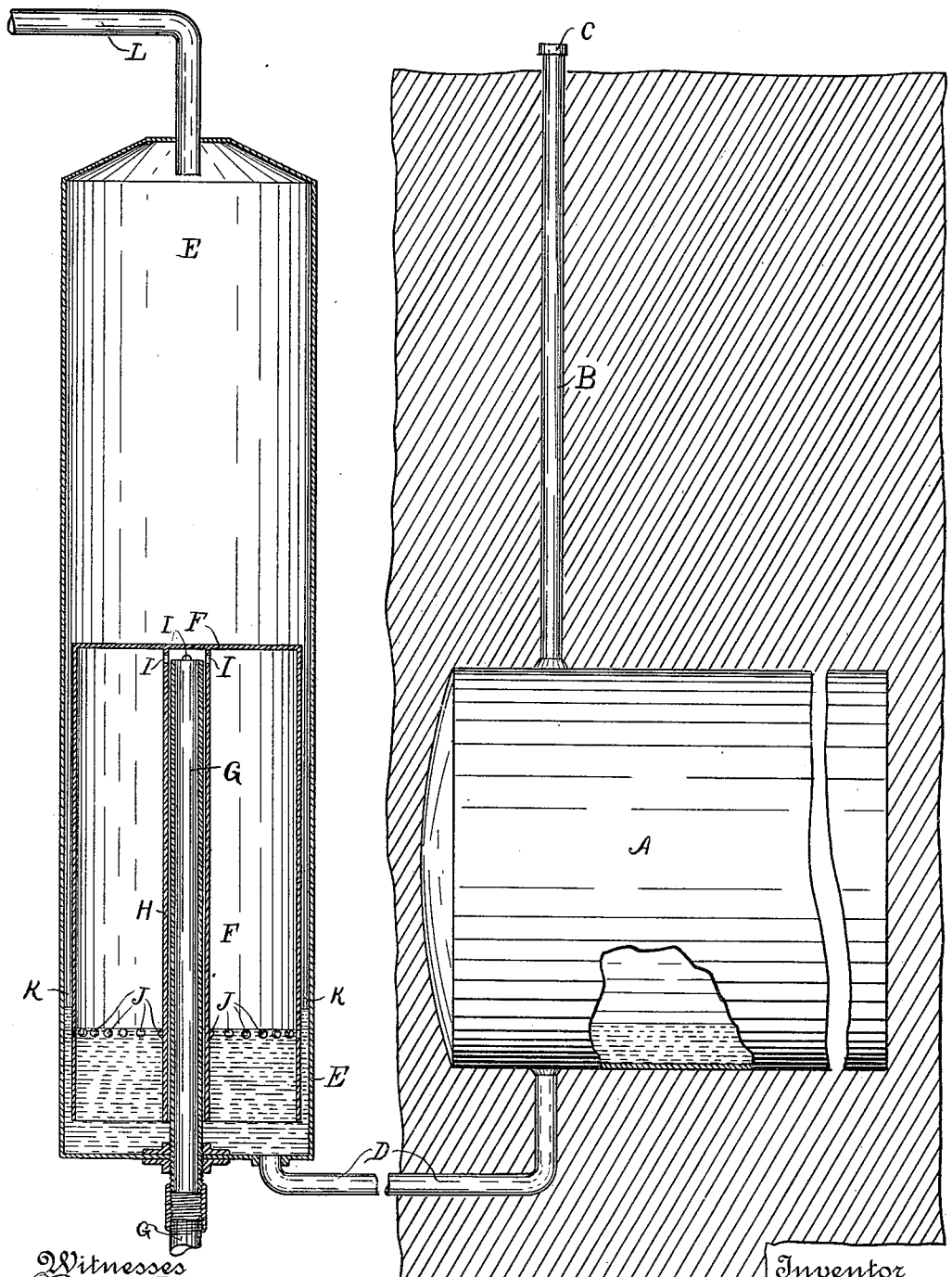

WILLIAM J. EGAN, OF MILWAUKEE, WISCONSIN, ASSIGNOR TO FRANK L. KERSTEN, OF SAME PLACE.

CARBURETER.

SPECIFICATION forming part of Letters Patent No. 659,438, dated October 9, 1900.

Application filed October 2, 1899. Serial No. 732,283. (No model.)

*To all whom it may concern:*

Be it known that I, WILLIAM J. EGAN, a citizen of the United States, residing at Milwaukee, in the county of Milwaukee and State of Wisconsin, have invented new and useful Improvements in Carbureters, of which the following is a specification.

My invention relates to improvements in carbureters.

Heretofore carbureters have been devised in which a system of air-supply tubes or passages were supported upon or near the surface of a supply of carbureting liquid by means of a pneumatic float or closed air-chamber. The object of my invention, however, is to provide means whereby the air to be carbureted will be utilized to support an adjustable chamber upon the surface of the carbureting liquid, the chamber being thereby utilized both as a means for controlling and directing the air into and through the carbureting liquid and also as a regulator whereby the production of gas will be proportioned to the quantity used and the pressure of the air-supply.

In the following description reference is had to the accompanying drawing, in which my invention is shown in vertical section.

A is a gasolene-storage tank, which is preferably located underneath the surface of the ground, with a pipe B leading to the surface and through which the chamber A may be filled with gasolene. The pipe B may also be made to serve as a vent, in which case a small opening will be provided in the cap C. The gasolene is discharged by gravity from the storage-tank A through a pipe D into a vertically-disposed cylinder E. Within this cylinder E, I have located an air-chamber F, which is open at the bottom, with its lower edges submerged in the gasolene of the cylinder E.

G is an inlet-pipe leading from any suitable source of air-supply and extending vertically through the bottom of the cylinder E to a point therein of substantially the same height as the chamber F. The chamber F is provided with a depending hood H, covering the air-inlet pipe G and extending downwardly to the lower end of the chamber F. The upper end of this hood H is provided with apertures I, through which the air enters the chamber F from the inlet-pipe G. The chamber F is also provided with a series of perforations J near its lower end, through which the air escapes into the upper portion of the cylinder E, as hereinafter explained.

It will be observed that as the gasolene from the storage-tank A is permitted to freely enter the cylinder E through the pipe D the level of the liquid in the two chambers will tend to remain the same, and the chamber F will be buoyed up on the liquid in the cylinder E by the air-supply in said chamber.

It is obvious that the pressure of the air will tend to force the gasolene downwardly in the chamber F, so that its level will be below that of the gasolene in the narrow annular space K between the walls of the chamber F and those of the cylinder E, the chamber being lifted and the gasolene correspondingly depressed therein by the increasing pressure of air until the level of the liquid corresponds with a series of openings J, when the air escapes through said openings and bubbles upwardly through the gasolene in the space K and after becoming carbonized by the gasolene passes to the upper end of the cylinder, from which it is drawn off for use through the service-pipe L.

The hood H fits snugly over the air-inlet pipe G, the latter thus serving as a guide to keep the chamber F in its vertical position. The exterior diameter of the chamber is nearly equal to the interior diameter of the cylinder E, so that when the chamber F is lifted to its greatest height the walls of the cylinder E may also be utilized to keep the chamber F in a vertical position. It is therefore evident that the escape of the air through the aperture I will be substantially equal on all sides with the chamber.

From the foregoing description it is evident that as the air-supply in the chamber F increases in proportion to the supply of gas above the chamber the chamber will be lifted and the surface of the carbureting liquid therein correspondingly depressed, so as to increase the discharge of air through the apertures J; but as the gas accumulates in the upper portion of the cylinder E the pressure thereof upon the upper end of the chamber F will tend to force the latter downwardly, thus submerging the apertures J in the gasolene and checking the passage of air therethrough. The chamber F is therefore made to serve not only as an air-supply chamber, but as a regulator, and the chamber F and cylinder E coöperate in performing the functions of a carbureter, while the cylinder E also serves as a gas-holder. The device will continue to operate until the reactionary pressure of the gas in the cylinder E and the air in the chamber F becomes sufficient to check a flow of air through the inlet-pipe G, when the further production of gas will cease until the withdrawal of gas through the pipe L relieves the pressure and again sets the device in operation.

Owing to the fact that the air is discharged through the apertures J into a narrow annular space K, it is evident that but a small quantity of gasolene will be exposed to the air at any one time. Hence the quality of the main body of the gasolene will not be affected by the vaporization of a portion of the liquid within the space K. The supply of liquid in this space will, however, be constantly renewed by the gasolene from the storage-tank A, and the operation of the device will continue until the supply in the tank A is exhausted. The chamber F will of course always correspond in height with the level of the liquid.

Having thus described my invention, what I claim as new, and desire to secure by Letters Patent, is—

1. A carbureter, comprising a fixed receptacle for carbureting liquid; an inlet-pipe leading thereto from a source of liquid-supply; an air-inlet pipe extending vertically within said receptacle and adapted to discharge the air at a point above the highest level of gasolene-supply; an air-chamber, open at bottom, and covering said air-inlet pipe, with a narrow space between said chamber and the walls of the said gasolene-receptacle, said air-chamber being buoyantly supported in the gasolene-supply by the air-supply entering through the air-inlet pipe, and being provided with a line of apertures near its lower edge or edges, and below the normal level at which said air-chamber is submerged in the carbureting liquid.

2. A carbureter, comprising a receptacle for carbureting liquid; an inlet-pipe leading thereto from a source of hydrocarbon-supply; an air-inlet pipe extending vertically within said receptacle; a vertically-movable air-chamber, open at bottom and covering the air-inlet pipe, with its lower edges submerged in the liquid hydrocarbon, said chamber being provided with a line of perforations or apertures below the level of the liquid exterior to said chamber; a hood secured in the interior of said chamber and covering the air-inlet pipe to a point below the surface of the carbureting liquid, said hood being adapted to hold the air-chamber in a vertical position upon said air-inlet pipe, and being provided with air-escape openings above the level of the carbureting liquid, whereby the air from said inlet-pipe is permitted to enter the air-chamber and support the same buoyantly in the carbureting liquid.

3. A carbureter, comprising a receptacle; a gravity feed-pipe leading thereto from a source of hydrocarbon-supply; an air-inlet pipe extending vertically in said receptacle, to a point above the highest level of the carbureting liquid; a vertically-movable air-chamber slidably mounted upon, and guided by said air-pipe, said chamber being arranged to be supported by the pressure of the air-supply therein, acting upon the surface of the carbureting liquid; means for permitting the escape of air from said chamber in small jets at a point below the surface of the carbureting liquid exterior to said chamber; and means for drawing off the carbureted air accumulating above said air-chamber.

In testimony whereof I have hereunto set my hand this 2d day of September, 1899.

WILLIAM J. EGAN.

Witnesses:
L. C. WHEELER,
J. P. MEYER.